United States Patent [19]
Persson

[11] Patent Number: 4,651,385
[45] Date of Patent: Mar. 24, 1987

[54] APPARATUS FOR FEEDING FISH TO A FISH PROCESSING MACHINE

[76] Inventor: Agne Persson, Kaivokatu 6 B, 21100 Naantali, Finland

[21] Appl. No.: 822,402
[22] PCT Filed: Mar. 19, 1985
[86] PCT No.: PCT/FI85/00026
  § 371 Date: Nov. 12, 1985
  § 102(e) Date: Nov. 12, 1985
[87] PCT Pub. No.: WO85/04076
  PCT Pub. Date: Sep. 26, 1985

[30] Foreign Application Priority Data

Mar. 19, 1984 [FI] Finland ................... 841080

[51] Int. Cl.$^4$ ............................................. A22C 25/08
[52] U.S. Cl. ............................................. 17/55; 17/24
[58] Field of Search ................... 17/55, 53, 24

[56] References Cited
U.S. PATENT DOCUMENTS 3,348,260 10/1967 Bartels et al. ........................ 17/55
3,561,041 2/1971 Szymanski et al. ............... 17/55 X Primary Examiner—Willie G. Abercrombie
Attorney, Agent, or Firm—Ladas & Parry

[57] ABSTRACT

An apparatus for feeding fish into a fish processing machine, whereby the amount of fish fed into said apparatus at least equals to the maximum capacity of the processing machine. The fish are delivered head first and with the abdomen in a certain direction from orientation means (1-14) to an accelerator (17, 18) and therefrom at a speed of about 3 to 8 m/s into a synchronizer comprising e.g. a roll (19) and an outer guide (20). A fish (21) is caught in a gap between the roll (19) and the guide (20), provided said gap is empty. Whenever a pocket (16) of a feeding belt (15) of the processing machine goes past the roll (19), a waiting fish (24) is thrown therein at a high rate, whereas a fish (21) caught in said gap is immediately advanced to the position thus left empty by the previous waiting fish (24). As long as a fish (21) remains in the said gap it deflects subsequent fishes (22) into a pass-by chute (23). In this way the fish themselves ensure an even flow of individual fishes to the conveyor belt (15).

9 Claims, 4 Drawing Figures

APPARATUS FOR FEEDING FISH TO A FISH PROCESSING MACHINE

The present invention relates to an apparatus for feeding fish to a fish processing machine, which apparatus comprises means for orientation of the head and the abdomen of the fish in a desired direction.

Machines which orientate the fish so that they are fed head first into a processing machine have been known for a long time. Furthermore, machines which turn the fish to be processed so that the side thereof faces in a certain direction are known. E.g. the FI Patent Application No. 811371; the DE Patent Specification Nos. 1,293,417, 1,454,085, 1,679,060 and 3,229,502; the NO Patent Specification Nos. 5504 and 28,191; the SE Patent Nos. 324,045 and 340,342 and the U.S. Patent Specification Nos. 3,514,811 and 4,399,588 are mainly concerned with said functions, i.e. feeding the fish head first and the abdominal side thereof facing in a certain direction.

In order to provided a fully automatic method of feeding fish into a processing machine, it is, further, necessary that the fish are fed into the receiving pockets of said machine one by one and at a proper rate. E.g. the NO Patent Specification Nos. 74,699, 75,934 and 107,895; the SE Patent Specification No. 386,357 and the U.S. Patent No. 3,561,041 are concerned with this problem. A disadvantage of these and other commercially available feeding apparatuses is that they are slow and therefore several parallel feeds are required in order to obtain a capacity of filling three to six pockets per second, which generally corresponds to the processing speed. Accordingly, plenty of room is required. If the feeder includes a spike which pierces through the fish (DE Patent Specification No. 1,579,590, SE Patent Specification No. 313,899), the fish may be damaged. A tube or a narrow chute for orientation limits the size of the fish to be processed (e.g. DE Patent Specification Nos. 1,293,416 and 1,579,590 and SE Patent Specification No. 313,899). On the other hand, if the chute is larger, there is the risk that the fish turn so that the abdomen thereof faces in the wrong direction. (NO Patent Specification No. 81,039).

The object of the present invention is to provide a new apparatus for feeding the fish into the receiving pocket of a feed bed of a fish processing machine, processing speed of which may vary within wide limits.

The apparatus according to the invention is mainly characterized in that between the fish orientation means and the fish processing machine is arranged a feed synchronizing means adapted to the speed of the fish processing machine, the receiving end of the feed synchronizing means being dimensioned to be temporarily blocked by received fish so that a subsequent fish, arriving too early with respect to the feed rate of the processing machine, is deflected past the feed synchronizer means.

The invention is based on the utilization of the aerodynamic shape of the fish. The fish is "shot" into the synchronizer, whereby it is fixed between the surface of e.g. a roll and a guide plate, and is further "shot" from the feeding apparatus into the receiving pockets. The feeding rate can be as high as 8 m/s which represents capacity increase in comparison to earlier machines. The feeding apparatus can simultaneously act as a kind of intermediate storage, which further reduces the required space.

In the following the invention will be described in more detail with reference to the attached schematical drawing.

Figure 1:
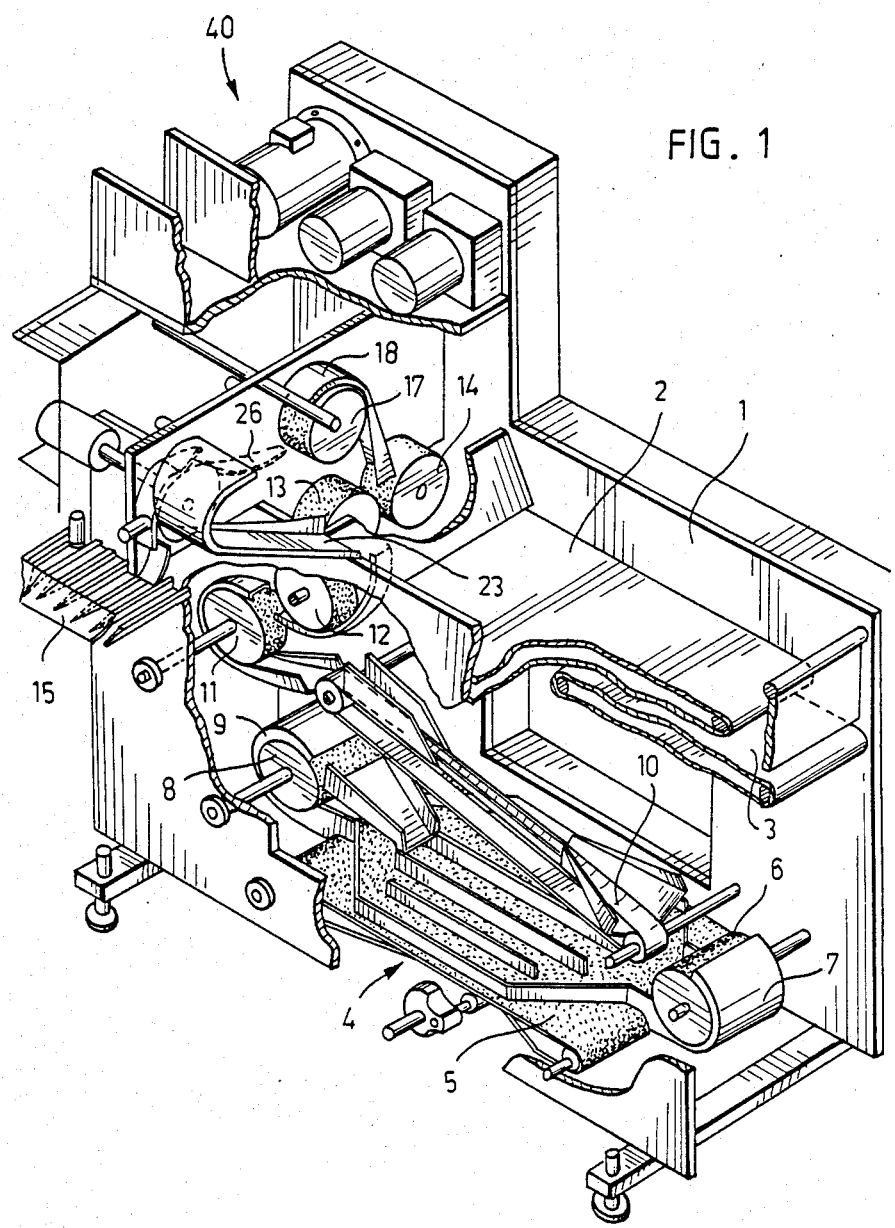
FIG. 1 is a perspective view of an embodiment of the feed apparatus.

In FIG. 1, a buffer storage for fish is designated 1. Its bottom comprises two transport belts 2 and 3 which feed the fish, at a rather rough dosage, to an underlying apparatus 4 for orientation of the fish with respect to head and tail. A vibrating belt 5 with parallel chutes orientates the fish lengthwise, part of the fish moving directly head first between a roller, or a brush 6, and guide plate 7 to a conveyor belt 10, the rest of the fish passing first between a roller 8 and a guide plate 9 and therefrom head first to the roller 6 and plate 7.

After the conveyor 10 follow two further roller (brush) and guide plate devices 11 and 12 wherefrom the fish enters head first in between two rollers or brushes 13 and 14 which, due to the generally triangular cross shape of the fish, orientate the abdomen of the fish in a certain direction. The working principles of each of the foregoing devices 1 to 14 are well known as such, for which reason a more detailed description is considered unnecessary.

Figure 2:
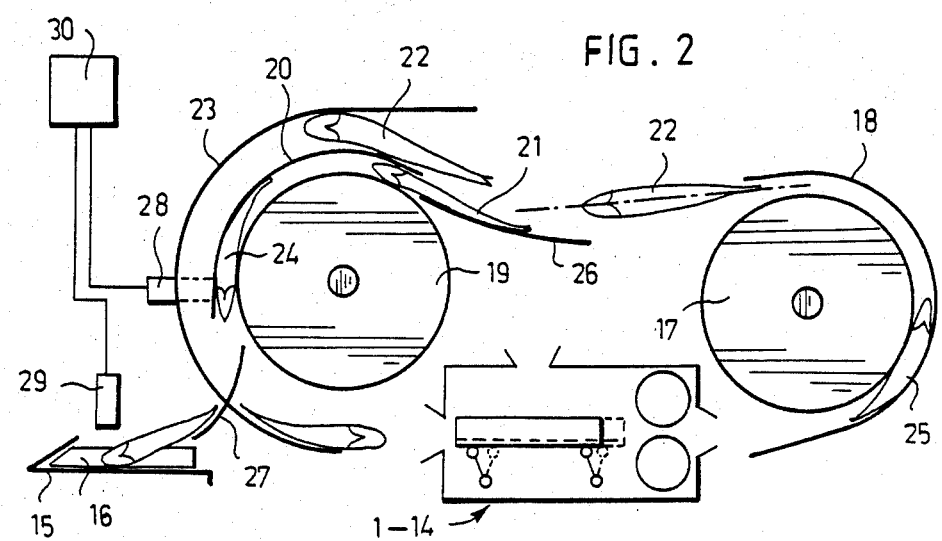
FIG. 2 is a side view of a first embodiment of a feed synchronizer.

The fish processing machine to be fed by the apparatus according to the present invention, such as e.g. a filleting machine, is in general designed to work at a certain rate and usually includes a conveyor belt or the like provided with pockets each intended to receive one fish orientated in a certain manner. In FIGS. 1 and 2 is shown only a minor part of this conveyor belt, reference numeral 15, with receiving pockets, 16.

Figure 3:
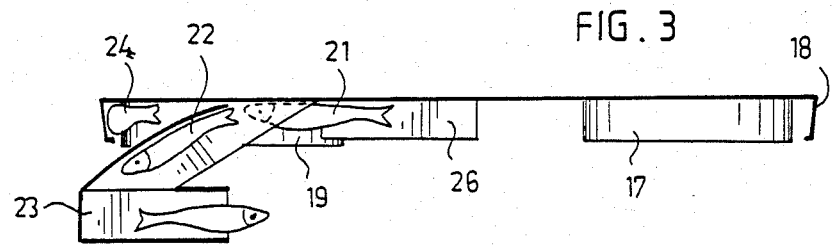
FIG. 3 shows the arrangement of FIG. 2 as seen from above.

The object of the invention is to provide an automatical feed of fish in synchronisation with the movement of the convenyor belt 15. The novel features by means of which the object is achieved relate to the arrangement after the abdomen orientation rollers 13 and 14 in FIG. 1, and these features will in the following be described mainly with reference to the schematical FIGS. 2, 3 and 4.

The over-all capacity (rate) of the feed and orientation devices 1 to 14 can with reasonable effort be brought to approximately match the capacity of the fish processing machine, but in earlier known apparatuses the problem has been to provide an even flow of individual fishes, in order to fill a sufficient number of receiving pockets 16, preferably all of them.

An accelerating device, e.g. in the form of a roll or brush 17 with an outer guide 18, is provided after the abdomen orientation rolls 13 and 14. According to FIG. 2, the fish are thrown by the roll 17 onto the surface of an intermittently rotating roll 19 provided with an outer guide 20. As long as the roll 19 is stationary, or moves only slowly, the fish 21 blocks the receiving opening between the roll surface and the outer guide 20 and deflects oncoming fishes 22 into a return chute 23 leading e.g. back to the storage 1. As the conveyor 15 moves along, an empty pocket 16 arrives at the roll 19 which then is actuated to feed therein a waiting fish 24 and to simultaneously forward the fish 21 to the waiting or ready position, whereby a new fish 25 will be fed in between the roll 19 and the guide 20. Reference numeral 26 indicates a guide out of contact with the roll 19, and numeral 27 indicated a guide to the conveyor 15, 16. 28 indicates a detector for monitoring that a fish 24 is available for feeding to a receiving pocket 16, the pockets are monitored by a detector 29. On the basis of the signals provided by the detectors 28 and 29, an actuator 30 brings about rotation of the roll 19. Suitable detector and actuator equipment are available.

Figure 4:
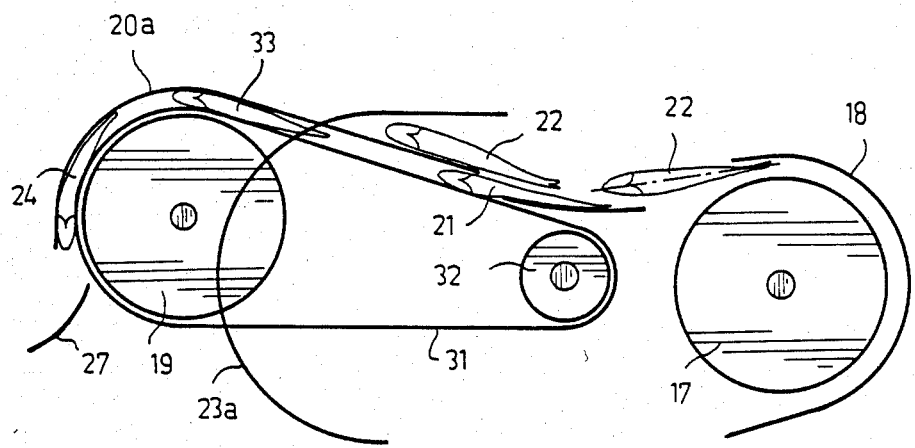
FIG. 4 is a side view of a second embodiment of a feed synchronizer.

The alternative arrangement shown in FIG. 4 differs from the one of FIG. 2 in that instead of the mere roll 19 there is a belt 31 driven by the roll 19 and running around an additional roll 32. The guides 20a and 23a are, accordingly, slightly different. The embodiment of FIG. 4 is to some extent more flexible in that it can contain one or more additional fishes 33 and thus can adapt to occasional slow-downs in the feed- and-orientation devices 1 to 14. Additional detectors similar to the one designated 28 may be provided to monitor said additional fishes 33 and the belt 31 can be made to move with less abrupt variations of speed than generally is the case for the mere roll 19 of FIG. 2.

The idea of using the fish themselves to achieve a uniform and efficient feed to the fish processing machine remains basically the same in the embodiments of both FIG. 2 and FIG. 4. The guides 20 and 20a are preferably adjustable with respect to the roll 19 or the belt 31, for fish of various sizes. In the FIGS. 2 and 4 the guides 20 and 20a are shown in one piece but the receiving end may as well comprise a separate part preferably hinged and acted upon by a spring into a receiving position when the part is not in contact with a fish. An in-coming fish 21 pivots the part against the force of the spring to lie along the side of the fish 21, and when the fish 21 has passed the spring returns the part to its receiving position.

The surface of the rolls 17 and 19 and of the belt are of a material providing a greater friction with respect to the fish than between the fish and the respective outer guides 18, 20 and 20a which may be made of smooth metal. Rotating brushes may be used instead of the roll 17 and, in FIG. 2, the roll 19.

The accelerating device 17, 18 may be of a different type and can in priciple be omitted altogether, provided that the orientation rolls or brushes 13 and 14 give the fish enough speed or perhaps are arranged higher upp than the synchronizer in order to use the free (guided) fall for further acceleration.

The motors, e.g. eletrical motors for driving the various parts of the feed apparatus are schematically shown in FIG. 1 and are collectively designated 40. Apart from the roll 19, the drives may operate at essentially constant speed according to the capacity of the fish processing machine and, as earlier indicated, the longer the belt 31 is, in FIG. 4, the more continuously it may operate, especially if the accelerator 17, 18 would be replaced by a similar belt structure provided with detectors like the one designated 28 in FIG. 2; the speed of the belt 31 could then be adjusted more smoothly in response to the signals of such detectors along the fish accelerator, together with the signals of the detectors monitoring the positions of the fishes 33 and 24 along the belt 31. Such an arrangement would, on the other hand, require more space and a more complicated electronic regulating system.

In order to achieve an effective wedge action between the receiving end of the guide 20 and the roll 19, or the guide 20a and the belt 31, the gap, when empty, is preferably slightly smaller than the head portion of the fish. Either the surface of the roll 19 and of the belt 31 is resiliently flexible, or at least the receiving end of the outer guide 20, 20a is of a resiliently flexible material. Alternatively or in addition, a flap of e.g. rubber may be provided to hang down from the receiving edge of the guide 20, 20a, preferably not quite into contact with the roll or belt surface. Such a flap is then be bent in under the guide by an incoming fish 21 and the edge of the flap is in contact with the fish until its tail has passed, thereby securing that a subsequent fish 22 is not received too close to the previous one.

I claim:

1. Apparatus for feeding fish to a fish processing machine, which apparatus comprises means (1-14) for orientation of the head and the abdomen of the fish in a desired direction, characterized in that between the fish orientation means (1-14) and the fish processing machine (15, 16) is arranged a feed synchronizing means adapted to the speed of the fish processing machine, the receiving end of the feed synchronizing means being dimensioned to be temporarily blocked by received fish (21) so that a subsequent fish (22), arriving too early with respect to the feed rate of the processing machine (15, 16), is deflected past the feed synchronizer means.

2. An apparatus according to claim 1, characterized in that the feed synchronizing means comprise a drive means (19; 31), an outer guide (20; 20a) which together with the drive means forms a receiving opening into which an in-coming fish (21) is wedged by its head portion, detector means (29, 28) for monitoring a conveyor (15) with receiving pockets (16) of a fish processing machine and for monitoring that a fish (24) is available at a ready-position for feeding into a receiving pocket, and means (30) for actuating the drive means (19; 31).

3. An apparatus according to claim 2, characterized in that the drive means is a roll (19).

4. An apparatus according to claim 2, characterized in that the drive means is a conveyor belt (31).

5. An apparatus according to claim 2, characterized in that at least the receiving end of the outer guide (20; 20a) is adjustable with respect to the drive means (19; 31).

6. An apparatus according to claim 5, characterized in that the receiving end of the outer guide (20; 20a) comprises a separately adjustable part.

7. An apparatus according to claim 6, characterized in that said separate part is hinged and is acted upon by a spring into a receiving position when not contacted by a fish and is pivoted by an incoming fish (21) to lie along the side of said fish, to secure that a subsequent, too early arriving fish (22) is deflected.

8. An apparatus according to any one of claims 1 to 7, characterized in that a fish accelerating means (17, 18) is arranged between the fish orientation means and the feed synchronizing means.

9. An apparatus according to any one of claims 2 to 8, characterized in that outside the feed synchronizer guide (20; 20a) is arranged a guide chute (23; 23a) for returning deflected fish (22) to a buffer storage (1).

* * * * *